United States Patent
Nordlund et al.

(10) Patent No.: US 9,704,084 B2
(45) Date of Patent: Jul. 11, 2017

(54) INTEGRATED TRACKING SYSTEM AND METHOD

(71) Applicant: WÄRTSILÄ FINLAND OY, Vaasa (FI)

(72) Inventors: Bjarne Nordlund, Vaasa (FI); Petri Helo, Vaasa (FI)

(73) Assignee: WARTSILA FINLAND OY, Vaasa (FI)

( * ) Notice: Subject to any disclaimer, the term of this patent is extended or adjusted under 35 U.S.C. 154(b) by 95 days.

(21) Appl. No.: 14/622,150

(22) Filed: Feb. 13, 2015

(65) Prior Publication Data

US 2015/0154487 A1 Jun. 4, 2015

Related U.S. Application Data

(63) Continuation of application No. PCT/FI2013/050632, filed on Jun. 11, 2013.

(30) Foreign Application Priority Data

Aug. 16, 2012 (FI) ...................................... 20125850

(51) Int. Cl.
*G06K 19/07* (2006.01)
*G06K 7/10* (2006.01)
(Continued)

(52) U.S. Cl.
CPC ..... *G06K 19/0723* (2013.01); *G06K 7/10009* (2013.01); *G06Q 10/08* (2013.01); *G06Q 50/28* (2013.01); *G06Q 50/30* (2013.01)

(58) Field of Classification Search
CPC ........... G06K 19/0723; G06K 7/10009; G06Q 10/08; G06Q 50/28; G06Q 50/30
See application file for complete search history.

(56) References Cited

U.S. PATENT DOCUMENTS

| 5,565,858 A | 10/1996 | Guthrie |
| 7,187,278 B2 | 3/2007 | Biffar |

(Continued)

FOREIGN PATENT DOCUMENTS

| CN | 101007588 A | 8/2007 |
| CN | 101052980 A | 10/2007 |

(Continued)

OTHER PUBLICATIONS

International Search Report (PCT/ISA/210) mailed on Aug. 16, 2013, by the European Patent Office as the International Searching Authority for International Application No. PCT/FI2013/050632.

(Continued)

*Primary Examiner* — Yong Hang Jiang
(74) *Attorney, Agent, or Firm* — Buchanan Ingersoll & Rooney PC

(57) ABSTRACT

An exemplary integrated tracking system tracks transported objects in a transportation system. The integrated tracking system includes a tracking device for providing at least location information of the at least one transported object. At least one processor unit generates and stores a predetermined model of transportation information of the at least one object. The predetermined model includes at least change-over location area information as the transportation information of the at least one transported object. The integrated tracking system includes at least two tracking sub-systems having the tracking device at least when the tracking device arrives in a change-over location area. The at least one processor unit integrates utilization of the at least one location information from at least two tracking sub-systems by comparing at least location information from different tracking sub-systems to the predetermined model.

10 Claims, 3 Drawing Sheets

(51) Int. Cl.
*G06Q 10/08* (2012.01)
*G06Q 50/30* (2012.01)
*G06Q 50/28* (2012.01)

(56) References Cited

U.S. PATENT DOCUMENTS

| | | |
|---|---|---|
| 7,265,668 B1 | 9/2007 | Brosius |
| 7,333,015 B2 | 2/2008 | Ekstrom |
| 7,564,352 B2 | 7/2009 | Ekstrom |
| 8,082,002 B2 | 12/2011 | Heinonen et al. |
| 8,294,573 B2 * | 10/2012 | Mermet ............... G01S 5/0027 340/539.3 |
| 2004/0124977 A1 | 7/2004 | Biffar |
| 2005/0250440 A1 | 11/2005 | Zhou et al. |
| 2005/0252259 A1 | 11/2005 | Ekstrom |
| 2006/0091206 A1 | 5/2006 | Olsen et al. |
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0145837 A1 | 7/2006 | Horton et al. |
| 2006/0217131 A1 | 9/2006 | Alizadeh-Shabdiz et al. |
| 2007/0216542 A1 | 9/2007 | Brosius et al. |
| 2007/0273505 A1 | 11/2007 | Brosius |
| 2008/0090523 A1 | 4/2008 | Heinonen et al. |
| 2008/0132170 A1 | 6/2008 | Alizadeh-Shabdiz et al. |
| 2008/0139217 A1 | 6/2008 | Alizadeh-Shabdiz et al. |
| 2008/0143523 A1 | 6/2008 | Ekstrom |
| 2008/0266131 A1 | 10/2008 | Richardson et al. |
| 2009/0075672 A1 | 3/2009 | Jones et al. |
| 2009/0177394 A1 | 7/2009 | Walz et al. |
| 2009/0237237 A1 | 9/2009 | Brosius |
| 2010/0076902 A1 | 3/2010 | Kraft |
| 2010/0149028 A1 | 6/2010 | Mermet et al. |
| 2011/0035420 A1 | 2/2011 | Alizadeh-Shabdiz et al. |
| 2011/0054979 A1 | 3/2011 | Cova et al. |
| 2011/0093443 A1 | 4/2011 | Alizadeh-Shabdiz et al. |
| 2011/0125663 A1 | 5/2011 | Kraft |
| 2011/0279264 A1 | 11/2011 | Brosius |
| 2011/0317579 A1 | 12/2011 | Jones et al. |
| 2012/0310854 A1 | 12/2012 | Cova et al. |
| 2012/0317048 A1 | 12/2012 | Brosius |
| 2013/0184003 A1 | 7/2013 | Alizadeh-Shabdiz et al. |

FOREIGN PATENT DOCUMENTS

| | | |
|---|---|---|
| CN | 101438326 A | 5/2009 |
| EP | 1 914 697 A1 | 4/2008 |
| KR | 10-2002-0072562 A | 9/2002 |
| KR | 2002-0072562 | 9/2002 |
| KR | 10-2006-0026226 | 3/2006 |
| WO | WO 96/08760 A1 | 3/1996 |
| WO | WO 02/44865 | 6/2002 |
| WO | WO 2005/091237 A1 | 9/2005 |
| WO | WO 2005/104675 A2 | 11/2005 |
| WO | WO 2009/088538 A1 | 7/2009 |
| WO | WO 2010134705 A2 | 11/2010 |
| WO | WO 2011/025987 A1 | 3/2011 |

OTHER PUBLICATIONS

Search Report issued Apr. 19, 2013, by the Finnish Patent Office in corresponding Finnish Patent Application No. 20125850.

Office Action (Notice of Grounds for Rejection) issued on Jul. 28, 2015, by the Korean Intellectual Property Office in corresponding Korean Patent Application No. 2015-7006497, and an English Translation of the Office Action. (15 pages).

Office Action issued on Oct. 19, 2015, by the Chinese Patent Office in corresponding Chinese Patent Application No. 201380054033.8. (4 pages).

* cited by examiner

INTEGRATED TRACKING SYSTEM AND METHOD

RELATED APPLICATION(S)

This application claims priority as a continuation application under 35 U.S.C. §120 to International Application PCT/FI2013/050632 filed on Jun. 11, 2013, designating the U.S., and which claims priority to Finnish Application 20125850 filed in Finland on Aug. 16, 2012. The content of each prior application is hereby incorporated by reference in its entirety.

FIELD

The disclosure relates to a tracking system and a method in transportation.

BACKGROUND INFORMATION

United Nations Multimodal Convention defines multimodal transport as follows: "'International multimodal transport' is the carriage of goods by at least two different modes of transport on the basis of a multimodal transport contract from a place in one country at which the goods are taken by the multimodal transport operator to a place designated for delivery situated in a different country". An example of multi-modal transportation could include a container being loaded from a trailer truck into a vessel and from the vessel into rail transportation in the destination harbour.

Tracking devices are electronics used for observing object movements and supplying timely ordered sequence of respective location and sensory data to depict the motion of goods. Tracking devices can include a location detecting system, such as satellite based positioning systems, for example Global Positioning System (GPS), Global Navigation Satellite System (GLONASS), GPS aided Geo Augmented Navigation (Gagan) or other GPS, microcontroller and radio transmitter/receiver system communicating frequently upstream to provide information for remote computer unit.

Tracking devices are mounted on material handling units such as transport containers. The challenges with currently available systems are two-fold: Firstly, on global transportation routes, the transport containers are placed in locations with limited location system coverage, for example pallets placed in metallic sea containers or sea containers placed under the metallic deck of a container ship. In these kind of conditions can exist under a so called Faraday shield phenomena causing serious operation problems for example to GPS based tracking. Secondly, in the radio communication to remote computer unit, the monitoring performance of the tracking device status is similarly limited or non-existing.

Vehicles on road and rail, as well as airplanes and seagoing vessel can be equipped with special tracking systems capable of sending location information to external computers. Truck companies have introduced such solutions for fleet management. For sea-going vessels, AIS (Automatic Identification System) provides similar information available in the Internet. Commercial aviation flights can be tracked similarly by using data provided by airplane transponder systems. These specific solutions are using advanced location devices with constant satellite visibility.

Known tracking applications suffer from lack of successful integration methods between different tracking environments and systems. This can cause practical problems for an international user because up-to-date and correct tracking information is available only occasionally.

SUMMARY

An exemplary integrated tracking system to track transported objects in a transportation system is disclosed, the system comprising: means for providing at least location information of one or more transported objects; and at least one processor unit configured to generate and store a predetermined model of transportation information of said at least one object containing the predetermined model, the model including at least change-over location area information as said transportation information of the at least one transported object, and the integrated tracking system includes at least two tracking sub-systems, the at least two tracking sub-systems including: a first tracking sub-system having a first tracking device for providing at least location information of said at least one transported object at least when the one or more transported objects arrive to a change-over location area; and a second tracking sub-system having a second tracking device for providing at least location information of the one or more transported objects at least when the one or more transported objects arrive to a change-over location area, wherein the integrated tracking system includes at least one processor unit to change tracking of the one or more transported objects from the first tracking sub-system to the second tracking sub-system when the one or more transported objects arrive at the change-over location area between the at least two tracking sub-systems on the basis of the provided location information, wherein, in order to perform automatic change-overs, the processor unit is configured to send an off-signal to the tracking device for entering a hibernating state in the change-over location area between the tracking sub-systems on the basis of the provided location information, and send an on-signal to the tracking device to enter an active state in the change-over location area between the at least two tracking sub-systems on the basis of the provided location information, and wherein the processor unit is configured to integrate utilization of said at least location information from the at least two tracking sub-systems by comparing at least location information from different tracking sub-systems of the at least two tracking sub-systems to information in said predetermined model to verify information by utilizing comparison methods between the provided information from the different tracking sub-systems.

An exemplary method for integrated tracking of transported objects during transport is disclosed, the method comprising: providing at least location information of at least one transported object; generating and storing a predetermined model of transportation information of said at least one object, wherein the predetermined model includes change-over location area information as said transportation information of the at least one transported object; providing at least location information of said at least one transported object at least when the at least one transported object arrives to a change-over location area between at least a first tracking sub-system and a second tracking sub-system; changing tracking of the transported object from a first tracking sub-system to a second tracking sub-system when the transported object arrives to the change-over location area between the tracking sub-systems on the basis of the provided location information; performing automatic change-overs from the first tracking sub-system to the second tracking sub-system by: sending, via a processor unit, an off-signal to the tracking device for entering a hibernation state in the change-over location area between the first and second tracking sub-systems on the basis of the provided location area information; and sending an on-signal to the tracking device for entering an active state in the change-over location area between the first and second tracking sub-systems on the basis of the provided location information; integrating utilization of said at least location information from the at least two tracking sub-systems by comparing at least location information from different tracking sub-systems of the at least two tracking sub-systems to information in said predetermined model; and verifying information by utilizing comparison methods between the provided information from different tracking sub-systems.

DETAILED DESCRIPTION

Figure 1:
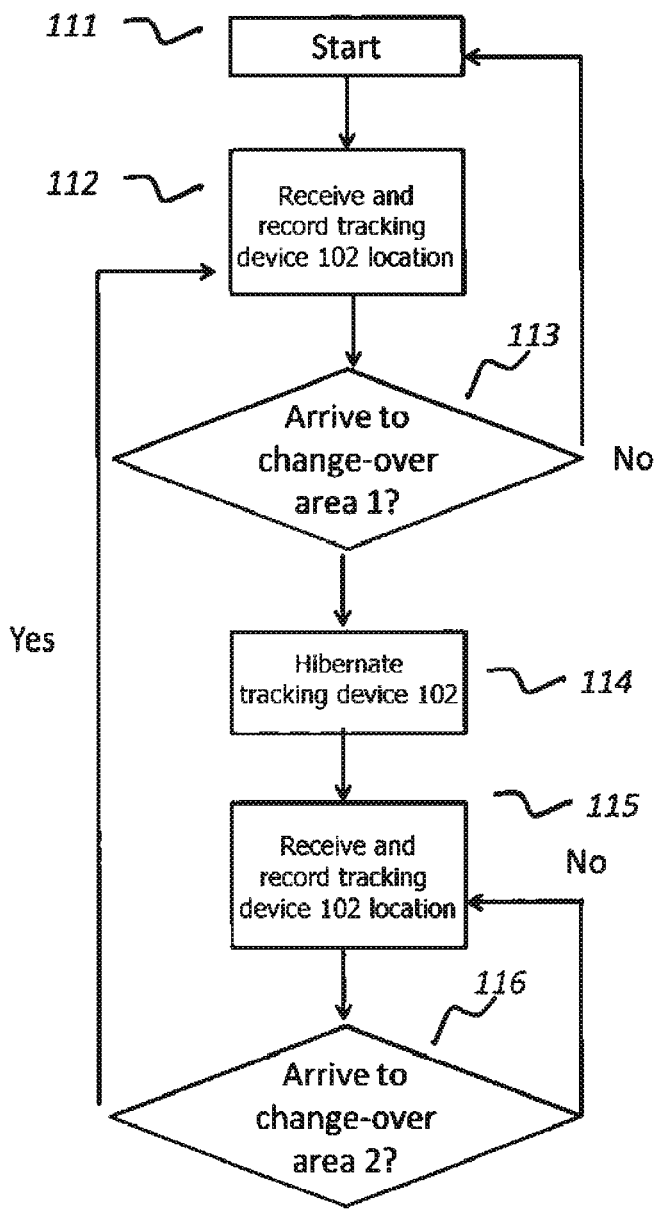
FIG. 1 is a flow chart of a method for tracking multi-modal transportation tracking by using location tracker roaming in accordance with an exemplary embodiment of the present disclosure.

Exemplary embodiments of the present disclosure relate to the field of tracking packages and shipments in logistics, more specifically, by use of mobile tracking devices, telecommunication and centralized computers. The object of the disclosure is to accomplish an integrated tracking system which can successfully utilize up-to date information from different tracking systems. This is achieved by an integrated tracking system to track transported objects in a transportation system including means (e.g., tracking device) for providing at least location information of the at least one transported object. The integrated tracking system includes at least one processor unit to form and store a predetermined model of transportation information of the at least one object, the predetermined model including at least change-over location area information as the transportation information of the at least one transported object, and the integrated tracking system includes at least two tracking sub-systems including the means (e.g., tracking device) for providing at least location information of the at least one transported object at least when it arrives to a change-over location area, and the integrated tracking system includes at least one processor unit which integrates at least the location information from at least two tracking sub-systems by comparing at least location information from different tracking sub-systems to the predetermined model.

Exemplary embodiments of the present disclosure provide a method for integrated tracking of transported objects during transport, in which method is provided at least location information of at least one transported object. In the method is formed and stored a predetermined model of transportation information of the at least one object, the predetermined model including change-over location area information as the transportation information of the at least one transported object, and in the method is provided at least location information of the at least one transported object at least when it arrives to a change-over location area between at least two tracking sub-systems, and is integrated with at least the location information from at least two tracking sub-systems by comparing at least location information from different tracking sub-systems to the predetermined model.

Exemplary embodiments disclosed herein are based on an integration of different tracking systems by utilizing a predetermined model of transportation information of at least one transported object. The predetermined model includes change-over location area information for the at least one transported object. The tracking systems include means (e.g., tracking device) for providing at least location information of the at least one transported object at least when it arrives to a change-over location area. Integrated utilization of at least location information from at least two tracking systems is performed for example in a central processor unit by comparing at least location information from different tracking systems to the predetermined model.

Exemplary embodiment of the present disclosure provide up-to-date and even worldwide tracking information can be made available to the user by utilizing transportation information gained from different kinds of tracking conditions and systems.

Exemplary embodiments of the present disclosure relate to a system and method for tracking different kinds of transported objects, e.g., packages, shipments, transport containers, or other suitable types of objects in multi-modal transportation as desired. The system includes a server computer, for example, a processor unit receiving location and also sensory data from transmitter/receiver tracking devices mounted for example onto transport containers and similar tracking devices mounted into vehicles such as into seagoing vessels. The disclosure can be applied in different kinds of logistics environments including different transportation and storage modes. For example, the disclosure can be successfully utilized in a multimodal transportation system, the definition of which is provided herein.

An exemplary embodiment of the present disclosure provides a method that includes steps of: 1) A server computer stores location coordinates of change-over area, 2) a first tracking device mounted onto the transport container sends location information to the server computer frequently or infrequently, 3) hibernating second tracking device mounted onto the vehicle has arrived inside a defined, e.g., a predetermined change-over location area, 4) the server computer changes monitoring tracking to the second tracking device mounted onto the vehicle located now in the same change-over area as the first tracking device, e.g., the second tracking device ceases to hibernate and the first tracking device starts to hibernate, and 5) the server computer changes the tracking focus back to the first tracking device once the vehicle has arrived to a new change-over area.

According to another exemplary embodiment disclosed herein, despite multi-modal transportation and change-over between tracking devices, the user of server computer can be able to constantly track route of the transported object visualized on the computer user interface. The user interface can be a web browser based application, or any other application capable to be run on computer.

FIG. 1 is a flow chart of a method for tracking multi-modal transportation tracking by using location tracker roaming in accordance with an exemplary embodiment of the present disclosure. As shown in FIG. 1, the process starts (step 111) when location information of the first tracking device 102 is received and stored by the server computer, e.g., by the processor unit (step 112). The server computer compares the latest stored location information to predetermined change over area (step 113). In case the first tracking device 102 is not inside the predetermined change over area, the method resets and returns to step 111. As step 114, in case the first tracking device 102 has arrived to the predetermined change-over area, the first tracking device 102 will hibernate. The server computer then starts receiving and storing location information from the second tracking device 102 mounted into a vessel or a vehicle (step 115). This step is performed (e.g., repeated) until the second tracking device informs arrival to a new change-over location area (step 116), where the server computer changes tracking focus back to step 112, e.g., to the first tracking device.

Figure 2:
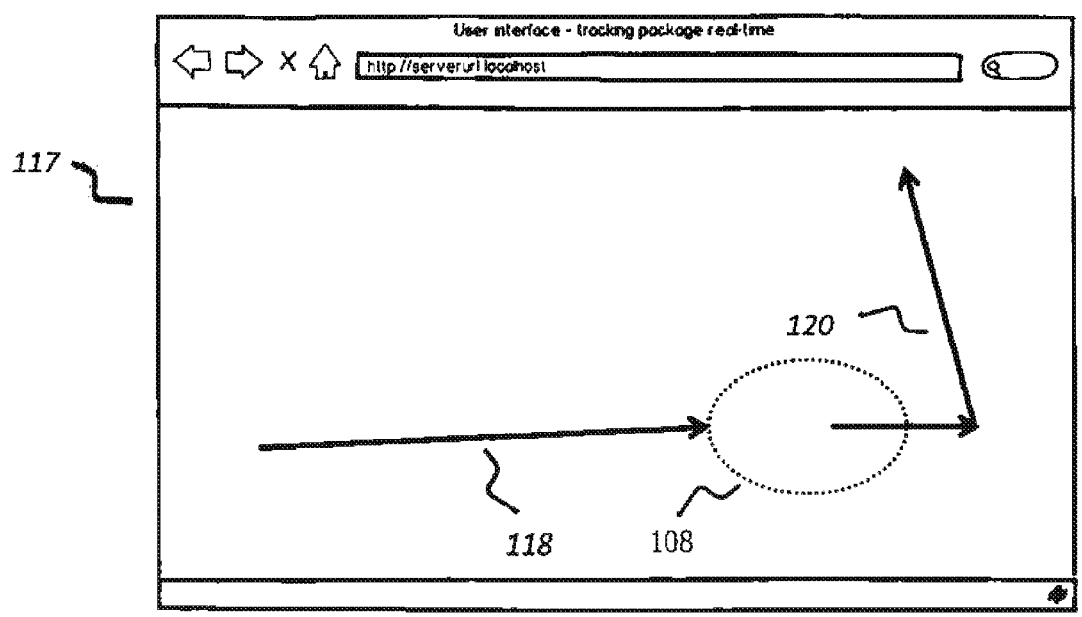
FIG. 2 illustrates an example of user interface by visualizing object tracking in accordance with an exemplary embodiment of the present disclosure.

FIG. 2 illustrates an example of user interface by visualizing object tracking in accordance with an exemplary embodiment of the present disclosure. As shown in FIG. 2, the user interface 117 shows, via a computer screen, the movement of the tracked object (for example the transport container). From the perspective of the user, the visualized tracking information appears constant, when the computer automatically combines the received and stored information from the first tracking device 118 inside and outside the change-over area 108 and the received and stored information from the second tracking device 120. The combination results in a seamless object tracking record as visualized on the computer screen of FIG. 2.

Figure 3:
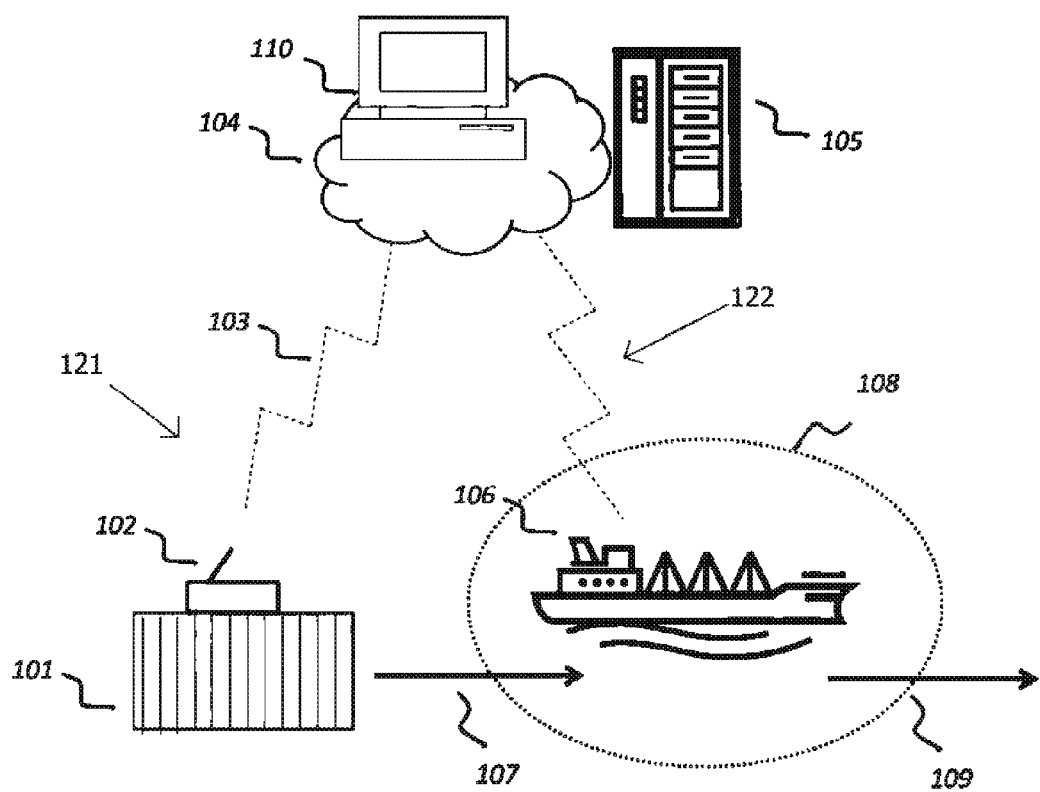
FIG. 3 illustrates architecture of an integrated system for tracking multi-modal transportation by using location tracker roaming in accordance with an exemplary embodiment of the present disclosure.

FIG. 3 illustrates architecture of an integrated system for tracking multi-modal transportation by using location tracker roaming in accordance with an exemplary embodiment of the present disclosure. As shown in FIG. 3, transported objects 101 can include for example ship engine parts, which are packed into boxes, e.g., into transport containers 101, and the multimodal transportation system includes for example sea vessel transportation, trailer track transportation and forklift truck transportation on factory areas. The tracking system includes means (e.g., tracking device) 102 for providing location information of the at least one transported object 101. These means 102 can be signal transmitting and receiving devices 102, which form and transmit location and/or sensory information in a wireless telecommunication network 103, and also receives for example on/off signals in the network 103. Thus the means 102 includes at least one antenna and electronics to form location information for example based on GPS technology, at least one transmitter and at least one receiver, and the means 102 can also include measuring technology, such as sensors, to generate for example humidity and/or temperature information as the sensory information. For example in a factory environment the means 102 can be implemented with tag technology, which can be integrated with specified electronics and measuring technology.

The signal transmitting and receiving devices 102 can be mounted to the transported object 101, e.g., to the transport container 101. The signal information transmitted by the means 102 to the telecommunication network 103 is received by at least one processor unit 110 in the integrated tracking system. The processor unit(s) 110 can also transmit, for example, the on/off signals to the means 102 through the telecommunication network 103. The processor unit(s) 110 includes transmitter and receiver technology to perform the transmitting and receiving operations. The telecommunication network 103 can be a telecommunication connection between the means 102 and the processor unit(s) 110 via, for example, the antenna of the means 102 and an antenna of the processor unit(s) 110. The telecommunication network 103 can also be for example global internet network or a local data communication network or the two networks integrated together.

According to an exemplary embodiment of the present disclosure, an integrated tracking system includes at least one processor unit 110 to form (e.g., generate) and store a predetermined model of transportation information of the transport container 101. The predetermined model includes change-over location area 108 information as the transportation information of the at least one transport container. The change-over location area 108 locates for example between sea vessel transportation and trailer track transportation, e.g., in a harbour side, and between trailer track transportation and forklift truck transportation on a factory loading and unloading area. Furthermore the predetermined model can include timely planned transportation route information. The at least one processor unit 110 is located (e.g., disposed) for example in a central computer unit of the integrated tracking system. It should be understood in the context of the exemplary embodiments described herein that forming the predetermined model and storing the predetermined model can be performed in a same processor unit 110 or in separated processor units 110.

According to another exemplary embodiment of the present disclosure, for example in FIG. 3, the integrated tracking system includes at least one processor unit 110 that sets limit values of the transportation information in the predetermined model. These limit values are, for example, time limit values of an arrival of the transport container 101 to the change-over location area 108 or of a departure of the transport container 101 from the change-over location area 108. The signal information transmitted by the means (e.g., tracking device) 102 to the telecommunication network 103 includes also time information of the arrival of the transport container 101 to the change-over location area 108 or time information of the departure of the transport container 101 from the change-over location area 108, and the transmitted signal information is received by the processor unit 110 or directly by an alarm processor 123 in the integrated tracking system. The alarm processor 123 can be integrated with the processor unit 110 or locating separately from the processor unit 110, for example, in the central computer unit for comparing the provided, e.g., received information from the means 102 to the limit values and for performing an alarm function (e.g., generating an alarm) in the integrated tracking system when the provided information exceeds one or more limit value.

The integrated tracking system includes at least two tracking sub-systems 121, 122, and each of these tracking subsystems includes the means (e.g., tracking device) 102 for providing at least location information of the at least one transported object at least when it arrives to the change-over location area 108. These tracking sub-systems 121, 122 can operate on different geographical areas 118, 120. According to an exemplary embodiment of the present disclosure, as shown in FIG. 3 the first tracking sub-system 121 operates in land transportation, e.g., in trailer track transportation and in forklift truck transportation and the second tracking sub-system 122 operates in sea vessel transportation. Also there can be a third tracking sub-system operating on factory areas. The integrated tracking system includes the processor unit 110 to change tracking of the transported object 101 from a first tracking sub-system 121 to a second tracking sub-system 122 when the transported object arrives to the change-over location area 108 on the basis of the received location area information.

The processor unit 110 integrates utilization of at least location information from at least two tracking sub-systems 121, 122 by comparing location information and/or other information from different tracking sub-systems 121, 122 to information in the predetermined model. The other information is for example humidity information as a part of the transportation information received from the means 102 telling information on transportation conditions in a sea vessel 106. The other described limit value comparisons, location information comparisons and/or other information comparisons can be performed in a same processor unit 110 or in separated processor units 110, which can utilize any suitable calculation programs, algorithms, data processing and analyzing programs, or other suitable program as desired, to perform the method steps according to the present disclosure.

According to an exemplary embodiment disclosed herein, as shown in FIG. 3 the transport container 101 can be physically moved 107 in the harbour into the sea vessel 106, which is located inside a preliminary defined change-over area 108. The processor unit 110 acknowledges this location change on the basis of the signal information received from first means (e.g., tracking device) 102 mounted to the transport container 101, and the processor unit 110 changes the operation state to transmission from second means 102 mounted to the sea vessel 106. The second means 102 are used in tracking movements 109 and location of the sea vessel 106, the transport container 101 being transported inside the sea vessel. In this change of operation state, the processor unit 110 sends an "off signal" to the first means 102, which hibernate, and the processor unit 110 sends an "on signal" to the second means 102, which start to operate, and the tracking operation is changed from the first tracking sub-system 121 to the second tracking sub-system 122. The described automatic change-over between transport container level information 121 and sea vessel level information 122 can be similarly implemented, for example, between transport container level information and trailer truck level information.

According to another exemplary embodiment of the present disclosure, and as shown in FIG. 3, provides benefits (e.g. advantages) when transporting outside the coverage area of the known tracking devices. The exemplary embodiments disclosed herein can be implemented by utilizing a centralized processor unit 110 containing information of the predetermined change-over areas 108 and communication protocols between the processor unit 110 and means 102 for providing at least location information of the transport container or sea vessel or trailer truck, or other suitable object as desired. The communication protocols can be supported for example by mobility management, authentication and authorization procedures to implement the exemplary tracking methods, e.g., roaming according to exemplary embodiments of the present disclosure.

According to exemplary embodiments described herein, the integrated tracking system can include one or more of any known general purpose processor or integrated circuit such as a central processing unit (CPU), microprocessor, field programmable gate array (FPGA), Application Specific Integrated Circuit (ASIC), or other suitable programmable processing or computing device or circuit as desired. The general processor(s) can be configured to include and perform features of the exemplary embodiments of the present disclosure such as, a method for integrated tracking of transported objects during transport, and thereby function as a special and unique processor. The features can be performed through program code encoded or recorded on the processor(s), or stored in a non-volatile memory device, such as Read-Only Memory (ROM), erasable programmable read-only memory (EPROM), or other suitable memory device or circuit as desired. In another exemplary embodiment, the program code can be provided in a computer program product having a non-transitory computer readable medium, such as Magnetic Storage Media (e.g. hard disks, floppy discs, or magnetic tape), optical media (e.g., any type of compact disc (CD), or any type of digital video disc (DVD), or other compatible non-volatile memory device as desired) and downloaded to the processor(s) for execution as desired, when the non-transitory computer readable medium is placed in communicable contact with the processor(s).

Exemplary embodiments according to the present disclosure have several advantages over known implementations. Firstly, for each planned shipment, a consolidated tracking view can be provided despite coverage problems in one or more tracking sub-systems. Secondly, battery lifetime of the tracking device (e.g., means 102) can be extended by placing the system in a hibernating state based on described change-over operation between the tracking sub-systems. Thirdly, tracking information provided by multiple tracking devices (mounted on vehicles, transport containers, or other suitable object as desired) from different tracking sub-systems can be used to verify information by utilizing comparison methods between the information from different tracking sub-systems.

Although the disclosure has been presented in reference to the attached figures and specification, the disclosure is by no means limited to those, as the disclosure is subject to variations within the scope allowed for by the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An integrated tracking system to track transported objects in a transportation system comprising:
   means for providing at least location information of one or more transported objects; and
   at least one processor unit configured to generate and store a predetermined model of transportation information of said at least one object containing the predetermined model, the model including at least change-over location area information as said transportation information of the at least one transported object, and the integrated tracking system includes at least two tracking sub-systems,
   the at least two tracking sub-systems including:
      a first tracking sub-system having a first tracking device for providing at least location information of said at least one transported object; and
      a second tracking sub-system having a second tracking device for providing at least location information of the one or more transported objects,
   wherein the integrated tracking system includes at least one processor unit to change tracking of the one or more transported objects from the first tracking sub-system to the second tracking sub-system when the one or more transported objects arrive at the change-over location area between the at least two tracking sub-systems on the basis of the provided location information,
   wherein, in order to perform automatic change-overs, the processor unit is configured to send an off-signal to one of the first and second tracking devices for entering a hibernating state in the change-over location area between the tracking sub-systems on the basis of the provided location information, and send an on-signal to the other one of the first and second tracking devices to enter an active state in the change-over location area between the at least two tracking sub-systems on the basis of the provided location information, and wherein the processor unit is configured to integrate utilization of said at least location information from the at least two tracking sub-systems by comparing at least location information from different tracking sub-systems of the at least two tracking sub-systems to information in said predetermined model to verify information by utilizing comparison methods between the provided information from the different tracking sub-systems.

2. An integrated tracking system in accordance with claim 1, wherein the predetermined model includes timely planned transportation route information.

3. An integrated tracking system in accordance with claim 1, wherein the integrated tracking system includes tracking sub-systems operating on different geographical areas.

4. An integrated tracking system in accordance with claim 1, wherein the tracking subsystems include means for providing at least humidity information as a part of said transportation information.

5. An integrated tracking system in accordance with claim 1, wherein the integrated tracking system includes at least one processor unit configured to set limit values of the transportation information in the predetermined model, and an alarm processor for comparing the transportation information to the limit values and for performing an alarm function in the integrated tracking system when the provided information exceeds one or more limit value.

6. A method for integrated tracking of transported objects during transport, the method comprising:
   providing at least location information of at least one transported object;
   generating and storing a predetermined model of transportation information of said at least one object, wherein the predetermined model includes change-over location area information as said transportation information of the at least one transported object;
   providing at least location information of said at least one transported object between at least a first tracking sub-system and a second tracking sub-system;
   changing tracking of the transported object from a first tracking sub-system to a second tracking sub-system when the transported object arrives to the change-over location area between the tracking sub-systems on the basis of the provided location information;
   performing automatic change-overs from the first tracking sub-system to the second tracking sub-system by:
      sending, via a processor unit, an off-signal to a first tracking device of the first tracking sub-system for entering a hibernation state in the change-over location area between the first and second tracking sub-systems on the basis of the provided location area information; and
      sending an on-signal to a second tracking device of the second tracking sub-system for entering an active state in the change-over location area between the first and second tracking sub-systems on the basis of the provided location information;
   integrating utilization of said at least location information from the at least two tracking sub-systems by comparing at least location information from different tracking sub-systems of the at least two tracking sub-systems to information in said predetermined model; and
   verifying information by utilizing comparison methods between the provided information from different tracking sub-systems.

7. A method in accordance with claim 6, comprising:
   generating and storing the predetermined model by generating timely planned transportation route information.

8. A method in accordance with claim 6, wherein the tracking sub-systems operate on different geographical areas.

9. A method in accordance with claim 6, comprising:
   providing at least humidity information as a part of said transportation information.

10. A method in accordance with claim 6, comprising:
   setting limit values of the transportation information in the predetermined model;
   comparing the provided information to the limit values; and
   performing an alarm function when the provided information exceeds one or more limit values.

* * * * *